United States Patent
Yamamoto

(10) Patent No.: US 7,303,057 B2
(45) Date of Patent: *Dec. 4, 2007

(54) PARKING DEVICE OF VEHICLE

(75) Inventor: Yasushi Yamamoto, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 160 days.

This patent is subject to a terminal disclaimer.

(21) Appl. No.: 10/530,523

(22) PCT Filed: May 25, 2004

(86) PCT No.: PCT/JP2004/007463

§ 371 (c)(1),
(2), (4) Date: Apr. 7, 2005

(87) PCT Pub. No.: WO2004/106780

PCT Pub. Date: Dec. 9, 2004

(65) Prior Publication Data

US 2006/0163024 A1     Jul. 27, 2006

(30) Foreign Application Priority Data

May 28, 2003   (JP)   ............................. 2003-151236

(51) Int. Cl.
F16H 63/34   (2006.01)
F16H 61/22   (2006.01)
B60T 1/06    (2006.01)

(52) U.S. Cl. ..................... 192/219.4; 74/335; 74/411.5

(58) Field of Classification Search .............. 192/219.4
See application file for complete search history.

(56) References Cited

U.S. PATENT DOCUMENTS 4,884,667 A * 12/1989 Koga ........................ 74/336 R
7,152,723 B2 * 12/2006 Yamamoto ............... 192/219.4
7,156,218 B2 *  1/2007 Yamamoto ............... 192/219.4

FOREIGN PATENT DOCUMENTS

| | | |
|---|---|---|
| DE | 10114031 | 3/2001 |
| JP | HE-5-49538 | 6/1993 |
| JP | 2000-264178 | 9/2000 |
| JP | 2001-280495 A | 10/2001 |
| JP | 2002-303367 | 10/2002 |

* cited by examiner

*Primary Examiner*—Rodney H. Bonck
(74) *Attorney, Agent, or Firm*—McGinn IP Law Group PLLC

(57) ABSTRACT

A parking device for vehicles in which when an engine is brought into a halt, a clutch is disconnected and the revolution of an input shaft of a transmission cannot be controlled by frictional force of the engine, the parking device includes a parking gear provided on the input shaft, a parking lock mechanism which selectively engages with the parking gear, a change lever which instructs a gear position of the transmission and is mechanically coupled to the parking lock mechanism, a speed-change actuator for shifting the transmission to each gear position, a neutral position detection unit of the change lever, a parking operation detection unit, a vehicle speed sensor, a control unit, wherein the control unit sends a control signal to the speed-change actuator to bring the transmission into engagement with a gear position that corresponds to the traveling speed of the vehicle.

2 Claims, 3 Drawing Sheets

PARKING DEVICE OF VEHICLE

TECHNICAL FIELD

The present invention relates to a parking device for vehicles in which when an engine is brought into a halt, a clutch is disconnected and hence, the revolution of an input shaft of a transmission cannot be controlled by a frictional force of the engine.

BACKGROUND ART

In a vehicle mounting an automatic transmission that comprises a fluid transmission, the vehicle has a structure that a hydraulic pressure is produced by a hydraulic pump driven by an engine, and a multiple-disc clutch is engaged by the hydraulic pressure to secure a gear position. When the engine is brought into a halt, therefore, no hydraulic pressure can be produced and consequently, the transmission automatically becomes a neutral state at the time of shutdown of the engine. Therefore, the vehicle mounting the automatic transmission that comprises a fluid transmission is not capable of limiting the rotation of the wheels by utilizing the frictional force of the engine. Accordingly, the vehicle mounting the automatic transmission that is a fluid transmission has a parking gear that is provided on the output shaft of the transmission and is equipped with a parking lock mechanism, which selectively engages with the above parking gear, so that the parking lock mechanism is engaged with the parking gear at the time of parking. When the parking gear provided on the output shaft of the transmission is locked, however, a maximum output torque of the transmission acts on the parking lock mechanism creating a condition, which is very disadvantageous from the standpoint of strength. In the medium-to heavy-sized trucks mounting the automatic transmissions, therefore, the parking lock mechanism is not established from the standpoint of strength and hence, the parking lock mechanism is hardly furnished.

Meanwhile, in the vehicles using a parallel shaft gear type transmission and using a hydraulic multiple-disc clutch or an electromagnetic powder clutch, too, the clutch is disconnected when the engine is brought into a halt and hence, the rotation of the wheels cannot be limited by utilizing the frictional force of the engine. In the vehicles of this type, too, therefore, it can be contrived to provide the output shaft of the transmission with a parking gear and to lock the parking gear at the time of parking. In the medium-to heavy-sized trucks, however, the parking lock mechanism is not established from the standpoint of strength as described above. To solve this problem, JP-A 2000-264178 discloses a parking device for a vehicle having a parking gear provided on the input shaft of the transmission so that the parking gear is locked at the time of parking.

However, in the parking device for vehicles in which the input shaft of the transmission is provided with a parking gear so that is locked at the time of parking, as is described in the above publication, the transmission must be brought into engagement with a predetermined gear position prior to locking the parking gear. When the change lever is operated to the parking position while the vehicle is traveling, however, it is operated to the parking position via the neutral position. Therefore, the clutch is disconnected and the transmission remains in the neutral state. Namely, in the device in which the parking lock mechanism is mechanically coupled to the change lever, no driving force acts on the input shaft of the transmission and hence, the parking lock mechanism works if the change lever is shifted to the parking position. As a result, the input shaft is locked making it difficult to bring the transmission into engagement with a predetermined gear position. Even when the change lever is operated to the parking position at the time of parking, therefore, the transmission remains in the neutral state arousing a problem in that the parking lock function does not work.

DISCLOSURE OF THE INVENTION

It is therefore an object of the present invention to provide a parking device for vehicles, which is so designed as to bring the transmission into engagement with any gear position even when the change lever is shifted to the parking position while the vehicle is traveling.

In order to achieve the above object, the present invention is to provide a parking device for vehicles in which when the engine is brought into a halt, a clutch is disconnected and the revolution of an input shaft of a transmission cannot be controlled by frictional force of the engine, the parking device comprising a parking gear provided on the input shaft, a parking lock mechanism which selectively engages with the parking gear, a change lever which instructs a gear position of the transmission and is mechanically coupled to the parking lock mechanism, and a speed-change actuator for shifting the transmission to each gear position; wherein said parking device further comprises a neutral position detection means arranged at a neutral position of the change lever, a parking operation detection means arranged in an operation passage of the change lever from the neutral position to a parking position, a vehicle speed sensor for detecting the traveling speed of the vehicle, and a control means for controlling the speed-change actuator and the clutch based on detection signals from the neutral position detection means, the parking operation detection means and the vehicle speed sensor; and when the operation of the change lever is detected by the parking operation detection means, the control means sends a control signal to the speed-change actuator based on a detection signal from the vehicle speed sensor to bring the transmission into engagement with a gear position that corresponds to the traveling speed of the vehicle.

Provision is further made of a limiting means for limiting the engagement of the parking lock mechanism with the parking gear, and the control means temporarily operates the limiting means based on a detection signal from the parking operation detection means when the operation of the change lever is confirmed.

BEST MODE FOR CARRYING OUT THE INVENTION

A preferred embodiment of a parking device for vehicles constituted according to the present invention will now be described in further detail with reference to the accompanying drawings.

Figure 1:
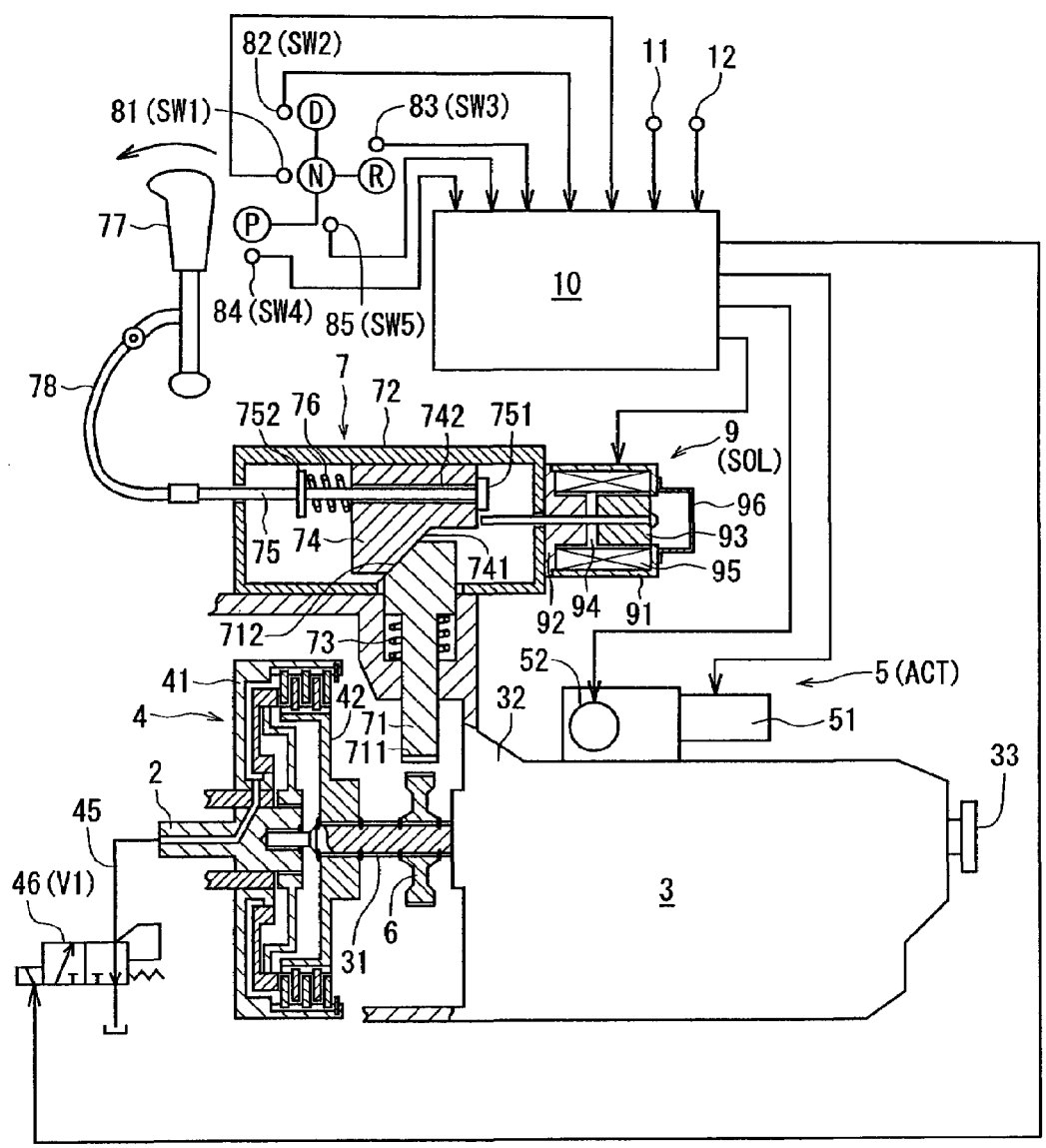
FIG. 1 is a view schematically illustrating the constitution of a parking device for vehicles according to the present invention.

FIG. 1 is a view schematically illustrating the constitution of a parking device for vehicles according to the present invention. A drive shaft 2 driven by an engine (not shown) such as an internal combustion engine and an input shaft 31 of a transmission 3 are arranged on the same axis. A hydraulic multiple-disc clutch 4 is arranged between the drive shaft 2 and the input shaft 31. The hydraulic multiple-disc clutch 4 may be constituted by a clutch outer 41 mounted on the drive shaft 2 and a clutch inner 42 mounted on the input shaft 31 in a customary manner. The hydraulic multiple-disc clutch 4 is connected, through a passage 45, to a hydraulic pump (not shown) driven by the engine, and an electromagnetic change-over valve 46 (V1) is disposed in the passage 45. The transmission 3 is a known parallel shaft gear type transmission, and is so constituted as to be brought into engagement with each gear position by a speed-change actuator 5. The speed-change actuator 5 may be the known one comprising a select actuator 51 and a shift actuator 52 which are constituted, for example, by electric motors, and is actuated by a speed-change instruction signal sent from a control means that will be described later.

A parking gear 6 is mounted on the input shaft 31 of the transmission 3. The parking gear 6 is so designed as to selectively engage with a parking lock mechanism 7. The parking lock mechanism 7 has an engaging member 71 that is arranged facing the outer periphery of the parking gear 6 and is supported by a casing 32 of the transmission 3 so as to slide in an up-and-down direction in the drawing. The engaging member 71 has, at a lower end thereof in the drawing, teeth 711 to engage with the parking gear 6, and has, at an upper end thereof, an inclined to-be-operated surface 712. The inclined to-be-operated surface 712 is inserted in a housing 72 arranged on the upper side of the casing 32. The thus formed engaging member 71 is urged upward in the drawing due to a coil spring 73 arranged relative to the casing 32. In the housing 72, an operation member 74 that operates the engaging member 71 is arranged so as to be allowed to slide in the right-and-left direction in the drawing. The operation member 74 has an inclined operation surface 741 that engages with the inclined to-be-operated surface 712 of the engaging member 74, and has a through-hole 742 penetrating through in the right-and-left direction in the drawing. An operation rod 75 is slidably inserted in the through-hole 742 of the thus formed operation member 74. A stopper 751 is mounted on the right end of the operation rod 75 in the drawing. Further, a spring receiver 752 is provided on the operation rod 75 on the left side of the operation member 74 in the drawing. A coil spring 76 is arranged between the spring receiver 752 and the operation member 74. A push-pull cable 78 operated by a change lever 77 is coupled to the left end of the operation rod 75 in the drawing. Therefore, when the change lever 77 is operated in a direction indicated by an arrow in the drawing, the operation rod 75 moves toward the right in the drawing via the push-pull cable 78 and hence, the operation member 74 moves toward the right in the drawing via the coil spring 76. When the operation member 74 moves toward the right in the drawing, the engaging member 71 moves downward in the drawing against the spring force of the coil spring 73 due to the engaging action between the inclined operation surface 741 of the operation member 74 and the inclined to-be-operated surface 712 of the engaging member 71, whereby the teeth 711 formed at the lower end thereof is brought into engagement with the parking gear 6.

In the illustrated embodiment, the above change lever 77 is so constituted as to be operated to the neutral position (N), drive position (D), reverse position (R) and parking position (P) in conformity with the operation pattern that is illustrated. Detection means are each provided at the respective operation positions of the change lever 77. Namely, a neutral position detection means 81 (SW1) is provided at the neutral position (N), a drive position detection means 82 (SW2) is provided at the drive position (D), a reverse position detection means 83 (SW3) is provided at the reverse position (R), and a parking position detection means 84 (SW4) is provided at the parking position (P) respectively. In the illustrated embodiment, a parking operation detection means 85 (SW5) is provided in the operation passage from the neutral position (N) to the parking position (P), i.e., between the neutral position (N) and the parking position (P). These detection means send their detection signals to the control means that will be described later.

In the illustrated embodiment, there is further provided an electromagnetic solenoid 9 (SOL) which serves as a parking lock limiting means for temporarily limiting the movement of the operation member 74 that constitutes the parking lock mechanism 7 even in a state where the change lever 77 has been operated to the parking position (P). The electromagnetic solenoid 9 (SOL) comprises a cylindrical casing 91, a fixed yoke 92 that is made of a magnetic material and is mounted on an end on the side of the housing 72 of the casing 91, a moving yoke 93 that comes in contact with, and separates away from, the fixed yoke 92, a push rod 94 that is made of a nonmagnetic material and mounted, at its one end, on the moving yoke 93, an electromagnetic coil 95 arranged surrounding the fixed yoke 92 and the moving yoke 93, and a cover member 96 that is mounted on the other end of the casing 91 and covers the moving yoke 93. In the thus constituted electromagnetic solenoid 9 (SOL), an end of the push rod 94 penetrates through the housing 72 and faces the right end surface of the operation member 74 in the drawing. When the electromagnetic coil 95 is energized in the thus constituted electromagnetic solenoid 9 (SOL), the moving yoke 93 is attracted by the fixed yoke 92, and the push rod 94 mounted on the moving yoke 93 moves toward the left in the drawing to limit the operation member 74 from moving toward the right in the drawing.

The parking device of the illustrated embodiment has a control means 10. The control means 10 is constituted by a microcomputer, and has a central processing unit (CPU) for executing an arithmetic processing according to a control program, a read-only memory (ROM) for storing the control program, a read-write random access memory (RAM) for storing the operated results, a timer and the like. The control means 10 receives detection signals from the neutral position detection means 81 (SW1), drive position detection means 82 (SW2), reverse position detection means 83 (SW3), parking position detection means 84 (SW4), parking operation detection means 85 (SW5), a vehicle speed sensor 11 for detecting a traveling speed of the vehicle, and an accelerator sensor 12 for detecting the amount of the accelerator pedal (not shown) depressed. The control means 10 sends control signals to the select actuator 51 and the shift actuator 52 that constitute the speed-change actuator 5 (ACT), to the electromagnetic change-over valve 56 (V1) and to the electromagnetic solenoid 9 (SOL), and the like.

The parking device of the illustrated embodiment is constituted as described above. Described below is the operation thereof.

When the change lever 77 is operated to the neutral position (N), the control means 10 sends a control signal to the select actuator 51 and the shift actuator 52 constituting the speed-change actuator 5 (ACT) based on a detection signal from the neutral position detection means 81 (SW1)

to place the transmission 3 in the neutral state. When the change lever 77 is positioned to the drive position (D), the control means 10 executes an automatic speed-change control based on a detection signal from the drive position detection means 82 (SW2). That is, the control means 10 determines a target gear position based on the detection signals from the vehicle speed sensor 11 and the accelerator sensor 12, and sends control signals to the select actuator 51 and to the shift actuator 52 so that the transmission is brought into engagement with the target gear position that has been determined. Next, when the change lever 77 is positioned to the reverse position (R), the control means 10 sends control signals to the select actuator 51 and to the shift actuator 52 based on a detection signal from the reverse position detection means 83 (SW3) so that the transmission 3 is brought into engagement with the reverse gear position.

Figure 2:
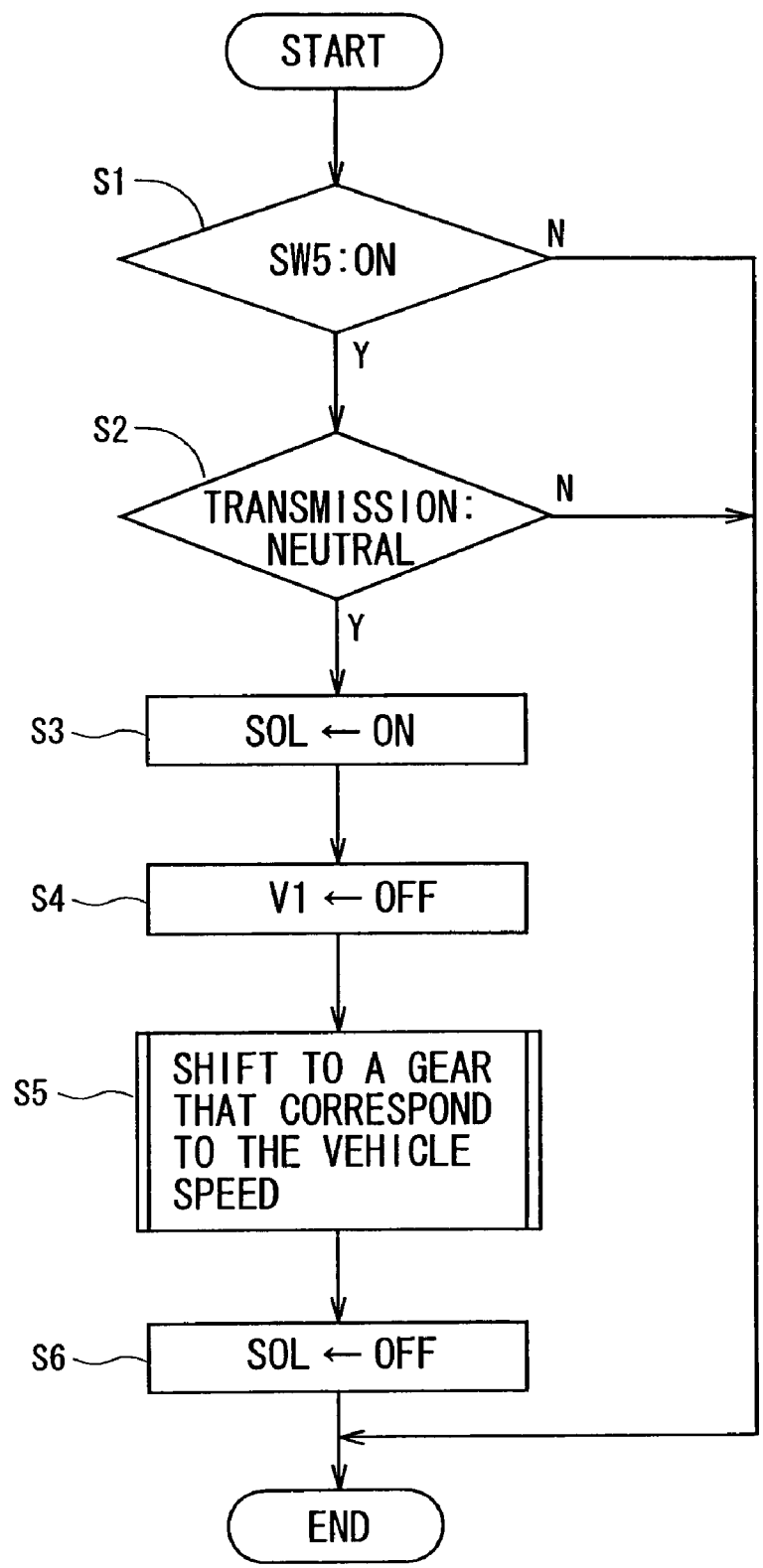
FIG. 2 is a flowchart illustrating the procedure of operation of a control means constituting the parking device for vehicles according to the present invention.

Next, described below blow is a case when the change lever 77 is operated toward the parking position (P) while the vehicle is traveling with reference also to a flowchart of FIG. 2.

When the change lever 77 is operated toward the parking position (P), as the parking operation detection means 85 (SW5) is disposed in the passage on the way to the parking position (P), the control means 10 at step S1 checks whether the parking operation detection means 85 (SW5) is turned on. When the parking operation detection means 85 (SW5) has not been turned on at step S1, the control means 10 judges that the change lever 77 is not operated toward the parking position (P), and ends the routine. When the parking operation detection means 85 (SW5) has been turned on at step S1, the control means 10 judges that the change lever 77 is operated toward the parking position (P), and proceeds to step S2 to check whether the transmission 3 is in the neutral state. In the case where the change lever 77 has an operation pattern shown in the embodiment, when the change lever 77 is operated to the parking position (P) during traveling of the vehicle, it passes the neutral position (N). Based on a detection signal from the neutral position detection means 81 (SW1), therefore, the control means 10 sends control signals to the select actuator 51 and the shift actuator 52 constituting the speed-change actuator 5 (ACT), so that the transmission 3 should have been placed in the neutral state. For caution's sake, however, the control means 10 checks at step S2 to make sure the neutral state. The neutral state of the transmission 3 is judged based on a signal from neutral position detection means (not shown) provided in the shift actuator 52.

When the transmission 3 is not in the neutral state at step S2, it means that the transmission 3 is engaged with any one of the gear positions, and the routine ends. When the transmission 3 is in the neutral state at step S2, the control means 10 proceeds to step S3 and produces a control signal to energize (turn on) the electromagnetic coil 95 of the electromagnetic solenoid 9 (SOL) thereby to operate the electromagnetic solenoid 9 (SOL). As a result, the operation member 74 is limited from moving toward the right in the drawing as described above.

Next, the control means 10 proceeds to step S4 to de-energize (turn off) the electromagnetic change-over valve 46 (V1) and to disconnect the transmission of power of the hydraulic multiple-disc clutch 4. The control means 10, then, proceeds to step S5 and sends control signals to the select actuator 51 and to the shift actuator 52 constituting the speed-change actuator 5 (ACT), so that the transmission 3 is brought into engagement with a gear position that corresponds to the traveling speed of the vehicle. As a result, transmission 3 is brought into engagement with a gear position that corresponds to the traveling speed of the vehicle. During this operation, the change lever 77 arrives at the parking position (P). Therefore, the operation rod 75 is operated toward the right in the drawing via the push-pull cable 78 while compressing the coil spring 76, whereby the coil spring 76 is compressed.

When the transmission 3 is brought into engagement with a gear position that corresponds to the traveling speed of the vehicle at step S5, the control means 10 proceeds to step S6 and de-energizes (turns off) the electromagnetic solenoid 9 (SOL). As a result, the operation member 74 is liberated from being limited, and moves toward the right in the drawing due to the force of the coil spring 76 that has been compressed. Due to the engaging action of the inclined operation surface 741 of the operation member 74 and the inclined to-be-operated surface 712 of the engaging member 71, therefore, the engaging member 71 moves down in the drawing against the spring force of the coil spring 73, and the teeth 711 formed at the lower end of the engaging member 71 are brought into engagement with the parking gear 6. Thus, by temporarily limiting the movement of the operation member 74 by operating the electromagnetic solenoid 9, the transmission 3 can be reliably brought into engagement with a gear position that corresponds to the traveling speed of the vehicle prior to locking the parking gear 6 or the input shaft 31 of the transmission 3 even when the change lever 77 is quickly operated to the parking position (P). When the vehicle is brought into a halt, therefore, the transmission 3 is brought into engagement with any one of the gear positions, the input shaft 31 is locked, the wheels (not shown) transmission-coupled to the output shaft 33 of the transmission are limited from rotating, and the parking state is established.

In the illustrated embodiment, the device is provided with the electromagnetic solenoid 9 (SOL) as the parking lock limiting means. The electromagnetic solenoid 9 (SOL), however, needs not necessarily be provided. That is, the parking operation detection means 85 (SW5) is provided in the operation passage on the way to the parking position (P) of the change lever 77 and hence, the control means 10 executes the speed-change control based on a detection signal from the parking operation detection means 85 (SW5). Therefore, unless the change lever 77 is operated to the parking position (P) at a considerably high speed, the transmission 3 can be reliably brought into engagement with a gear position that corresponds to the traveling speed of the vehicle before the input shaft 31 is locked by the parking lock mechanism 7.

Next, described below is a case where the change lever 77 has an operation pattern shown in FIG. 3, i.e., where the reverse position (R) exists between the neutral position (N) and the parking position (P).

Figure 3:
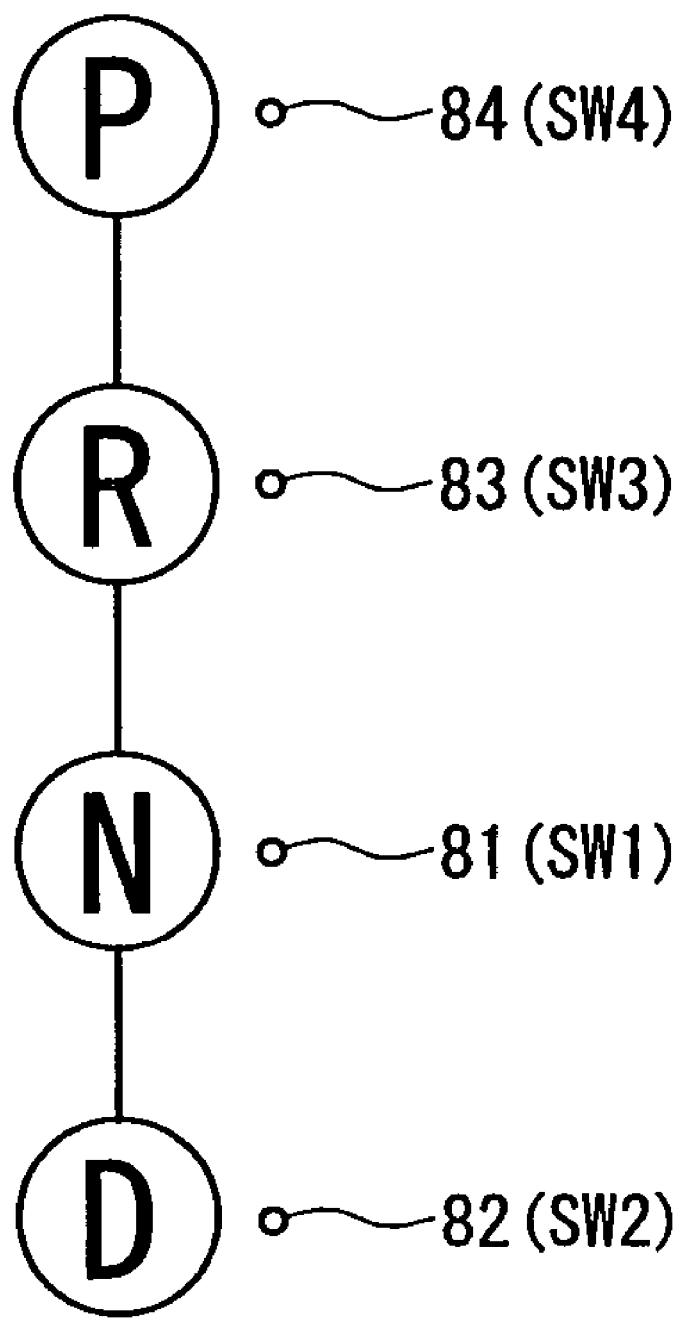
FIG. 3 is a diagram illustrating an operation pattern of a change lever constituting the parking device for vehicles according to the present invention.

In the case of the operation pattern shown in FIG. 3, when the change lever 77 is operated from the neutral position (N) to the parking position (P) while the vehicle is traveling (moving forward), the control means uses the detection signal from the reverse position detection means 83 (SW3) as a parking operation detection signal. That is, the change lever 77 is not operated to the parking position (P) while the vehicle is traveling (moving forward). In case a detection signal is input from the reverse position detection means 83 (SW3), therefore, the control means 10, usually, neglects it. In the illustrated embodiment, however, when the change lever 77 passes over the reverse position (R) while the vehicle is traveling (moving forward), the control means 10 judges that the change lever 77 is operated to the parking position (P), and executes steps S2 through S6 in the flowchart of FIG. 2 described above.

The parking device of the present invention is constituted as described above. When the parking operation detection means has detected the operation of the change lever, the control means sends a control signal to the speed-change actuator based on a detection signal from the vehicle speed sensor to bring the transmission into engagement with a gear position that corresponds to the traveling speed of the vehicle. When the change lever is operated to the parking position (P) while the vehicle is traveling, therefore, the transmission can be reliably brought into engagement with a gear position that corresponds to the traveling speed of the vehicle before the input shaft of the transmission is locked. When the vehicle is brought into a halt, therefore, the transmission is brought into engagement with any one of the gear positions and the input shaft thereof is placed in a locked state, the wheels transmission-coupled to the output shaft of the transmission are limited from rotating, and the parking state is established.

The invention claimed is:

1. A parking device for vehicles in which when an engine is brought into a halt, a clutch is disconnected and the revolution of an input shaft of a transmission cannot be controlled by frictional force of the engine, said parking device comprising a parking gear provided on said input shaft, a parking lock mechanism which selectively engages with said parking gear, a change lever which instructs a gear position of the transmission and is mechanically coupled to said parking lock mechanism, and a speed-change actuator for shifting the transmission to each gear position; wherein said parking device further comprises a neutral position detection means arranged at a neutral position of said change lever, a parking operation detection means arranged in an operation passage of said change lever from said neutral position to a parking position, a vehicle speed sensor for detecting a traveling speed of the vehicle, and a control means for controlling said speed-change actuator and said clutch based on detection signals from said neutral position detection means, said parking operation detection means and said vehicle speed sensor; and when the operation of said change lever is detected by said parking operation detection means, said control means sends a control signal to said speed-change actuator based on a detection signal from said vehicle speed sensor to bring said transmission into engagement with a gear position that corresponds to the traveling speed of the vehicle.

2. A parking device for vehicles according to claim 1, wherein provision is further made of a limiting means for limiting the engagement of said parking lock mechanism with the parking gear, and said control means temporarily operates the limiting means based on a detection signal from said parking operation detection means when the operation of said change lever is confirmed.

* * * * *